(12) United States Patent
Skuro

(10) Patent No.: US 7,766,477 B2
(45) Date of Patent: Aug. 3, 2010

(54) EXTENDABLE AND RETRACTABLE TELESCOPING EYEWEAR RETAINING STRAP ASSEMBLY

(76) Inventor: John Michael Skuro, 2033 Lone Pine Rd., Virginia Beach, VA (US) 23451

( * ) Notice: Subject to any disclaimer, the term of this patent is extended or adjusted under 35 U.S.C. 154(b) by 536 days.

(21) Appl. No.: 11/800,624

(22) Filed: May 7, 2007

(65) Prior Publication Data
US 2007/0268449 A1 Nov. 22, 2007

Related U.S. Application Data

(60) Provisional application No. 60/798,650, filed on May 9, 2006.

(51) Int. Cl.
*G02C 5/20* (2006.01)
(52) U.S. Cl. .................. 351/118; 351/119; 24/3.13
(58) Field of Classification Search .............. None
See application file for complete search history.

(56) References Cited

U.S. PATENT DOCUMENTS 1,616,215 A * 2/1927 Chilson ................... 63/5.2
3,450,467 A * 6/1969 Phillips ................... 351/157

* cited by examiner

*Primary Examiner*—Jack W. Lavinder
(74) *Attorney, Agent, or Firm*—John M. Brandt

(57) ABSTRACT

An extendable and retractable eyewear telescoping retaining strap assembly consisting of an outer tubular strap member and an inner strap member slidably disposed within the tubular member. Means are provided to secure the inner strap within the outer strap in the retracted position and to prevent the separation of the two straps when the inner strap is in the extended position. The assembly is attachable to the temple of an eyewear frame either by attaching the outer tubular strap to the temple or by attaching the inner strap to an additional retaining strap disposed within the temple. Each strap of the assembly is flexible and either longitudinally stretchable or inelastic to provide for different modes of use.

10 Claims, 2 Drawing Sheets

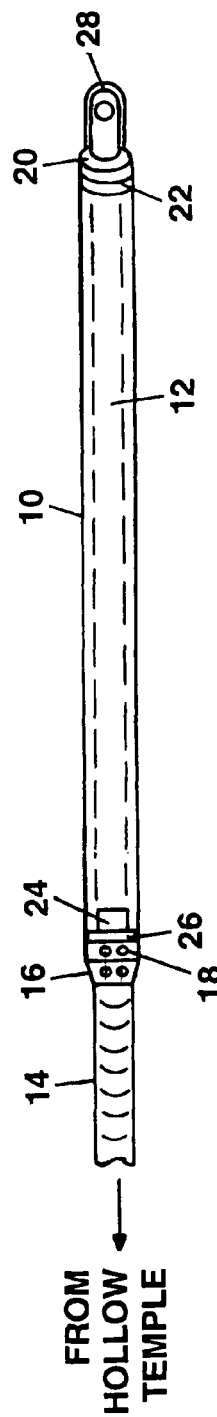
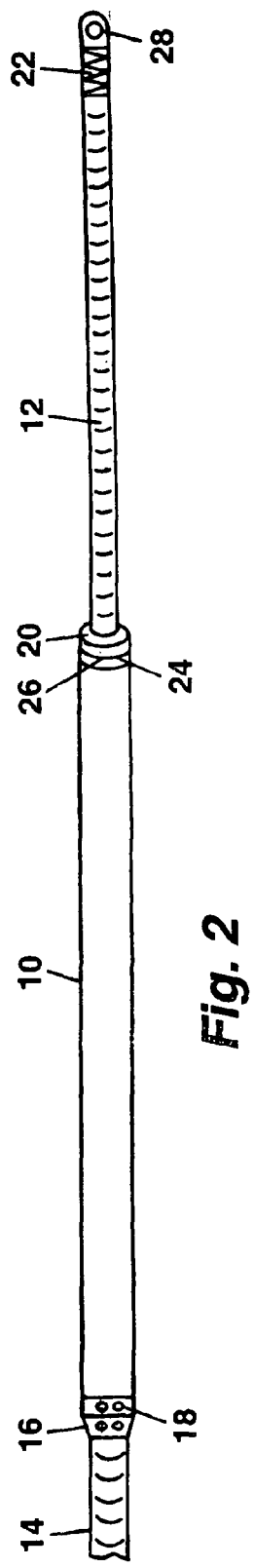
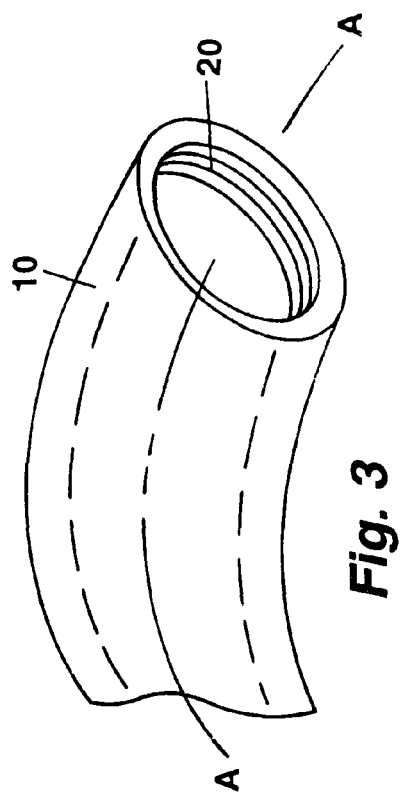

EXTENDABLE AND RETRACTABLE TELESCOPING EYEWEAR RETAINING STRAP ASSEMBLY

CROSS REFERENCE TO RELATED APPLICATIONS

This application is based on the disclosure of Provisional Application Ser. No. 60/798,650 filed May 9, 2006, which is hereby incorporated by reference.

BACKGROUND OF THE INVENTION

1. Field of the Invention

The invention relates to devices for securing eyewear to the body of a wearer and more particularly relates to retaining straps and strap retracting arrangements attachable to eyewear temples for holding eyewear in place about the head or neck.

2. Description of the Prior Art

Retaining straps for eyewear or eyeglasses are well known in the prior art. Simple string type retainers having loops at each end to engage eyewear temples are readily available. These devices are usually inelastic and are designed to allow the eyewear to be worn about the neck when removed from the head. Elastic retainers are also sold for use in sports activities to keep the eyewear securely attached to the head. Both of the prior art types of elastic and inelastic retainers are separate units which remain external to the eyewear.

U.S. Pat. No. 4,479,703, Enghofer, discloses a retaining assembly wherein the retaining straps are elastic and retract of there own elasticity into hollow temples. U.S. Pat. No. 6,547,388, Bohn, provides a similar device wherein the retaining strap coils about itself and is adjustable as to effective length by various stop mechanisms.

U.S. Pat. No. 6,905,206, Skuro, provides a retractable assembly within hollow eyewear temples for both elastic and inelastic straps so that both an active mode, i.e., secured to the head, and passive mode, for example, around the neck, are available. Additionally, the design of that patent provides for the straps to be completely retracted by an elastic member within the temple when neither form of use is desired.

The present invention provides an alternative device directed to the concept of an extendable and retractable retaining strap which is not incorporated within hollow eyewear temples as those described in the prior art above. In contrast, the arrangement disclosed herein presents a telescoping assembly which is attachable to an eyewear assembly but not contained within it.

SUMMARY OF THE INVENTION

The invention may be summarized as an alternative extendable and retractable telescoping arrangement for a retaining strap for head worn eyewear. By eyewear is meant any framelike device which contains, holds, or supports transparent, clear, colored, and/or corrective lens structures, which frame is supported on the head by the use of temples that fit over the ears. Items such as sunglasses, sight correcting eyeglasses, and safety glasses are all included in the class of eyewear for which the invention is appropriate.

In contrast to the prior art known to the inventor, this strap assembly is not contained within a hollow temple forming a portion of the eyewear frame, but instead is a telescoping arrangement of at least two straps consisting of an outer tubular strap member and an additional inner strap member, either longitudinally elastic or inelastic, which inner member is slidable in and out of the outer tubular member to provide the necessary length and/or choice of configurations of positions of use.

Both the outer tube member and inner extendable and retractable strap member are sufficiently flexible to provide a comfortable range of combinations for holding the eyewear in various positions, i.e., about the neck, above the eyes on the head, or about the neck. Both members may be inelastic or elastic to stretch in the longitudinal direction and may be used singly or in pairs, one assembly for each temple.

The inner strap is arranged to be secured within the outer strap when it is in the retracted position by, for example, a pair of matching threaded couplings on the end of each furthest from the temple. The inner strap is also prevented from separating from the outer strap in the extended position by, for example, an additional matching threaded coupling on the end nearest the temple, or a stop plate which will not pass beyond the outer strap end coupling.

An eyewear connector is attached to the extendable end of the inner strap for attachment to the opposite temple when one assembly is used or the end of a second assembly if one is employed with the opposite temple.

The assembly is capable of functioning as a retaining strap for any type of eyewear for any type of temple using, for example, a clip or a loop of cord to provide the attachment to the temple. It may also function as an extender of the previously described prior art extendable and retractable retainer straps disposed in a hollow temple especially constructed for the purpose.

These, and other features and advantages of the invention will become more evident from the description of the preferred embodiment accompanied by the drawings, which follows.

DESCRIPTION OF THE DRAWINGS

FIG. 1 is a perspective view of the preferred embodiment of the invention in a retracted state;

FIG. 2 is an additional view of the embodiment of FIG. 1 in an extended state;

FIG. 3 is a perspective view of a portion of one component of the embodiment of FIG. 1;

DESCRIPTION OF THE PREFERRED EMBODIMENT

Figure 4:
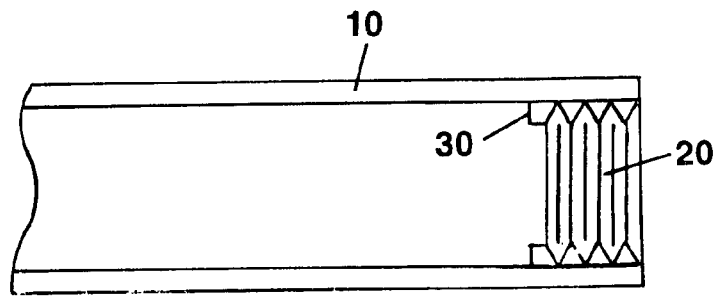
FIG. 4 is a cross-sectional view along line A-A of FIG. 3.

Referring first to FIG. 1, there is shown a perspective view of the preferred embodiment of the telescoping eyewear retainer strap assembly invention comprising an outer tubular retaining strap 10 and an inner retaining strap member 12 slidably disposed and retracted within strap 10. In this embodiment, the assembly functions as an extender for a retainer strap 14 disposed within a hollow temple as is extensively described in my above referenced and employs a coupling device of any convenient design such as a pair of mating threads 16 attached to inner strap 14 and 18 attached to outer strap 10.

In addition, a threaded coupling 20 is provided at the opposite inner strap receiving end of outer strap 10 and a mating coupling 22 is attached to inner strap 12 at the same end. In the retracted position, the inner strap is rotated to secure it within the outer strap. Another threaded coupling 24 is provided at the opposite temple end of inner strap 12 which also mates with coupling 20. When the inner strap is extended, it may again be rotated to secure it in the extended position. A stopping plate 26, also attached to the temple end of strap 12, will prevent the strap from separating from the outer strap 10 through over rotation. Finally, a connector 28 is attached to inner strap 12 which connector is attachable either to the eyewear itself, the opposite temple for example, or to a mating connector on a similar assembly attached to the opposite temple. Examples of appropriate connecting devices are fully described in my above referenced prior art patent.

Figure 5:
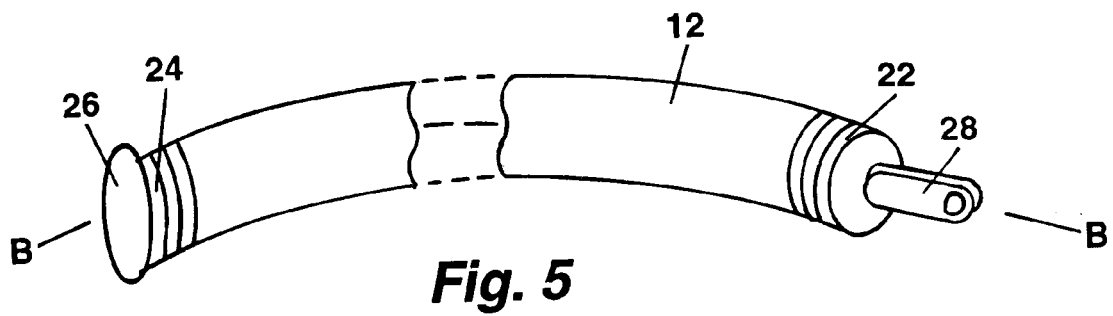
FIG. 5 is a perspective view of an additional component of the embodiment of FIG. 1.
Figure 6:
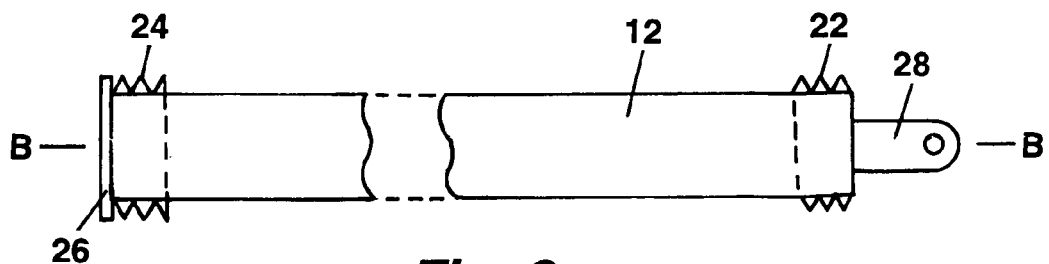
FIG. 6 is a cross-sectional view along line B-B of FIG. 5.

Referring next to FIGS. 3, 4, 5, and 6, detailed portions of the above described embodiment are shown in accordance with the description of the drawings stated above. Like numerals refer to like components of FIGS. 1 and 2. In particular, the flexibility of both the outer and inner straps are illustrated by FIGS. 3 and 5. Additionally, in FIG. 4, a stopping surface 30 is shown at the interior surface of coupling 20 which surface intercepts plate 26 at the furthest extension of inner strap 12.

Figure 7:
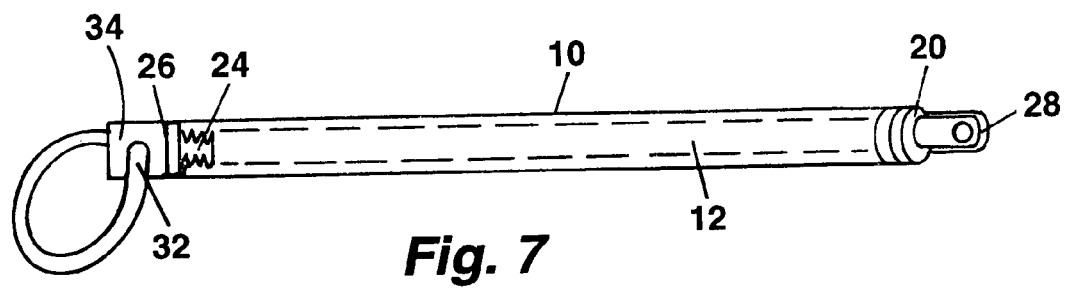
FIG. 7 is a perspective view illustrating an alternative means for attachment of the preferred embodiment to the eyewear.

Finally, FIG. 7 illustrates an embodiment in which the telescoping strap is a separate assembly which can be attached to the temple of any eyewear configuration having temples. A loop of cord 32 or other form of clip is secured to the end of outer tube 10 by a terminal fixture 34, a metal tube which is, for example, crimped or glued in place. The temple is then slipped through the loop to effect the attachment.

As variations in the above described preferred embodiment may be made within the general concept of the disclosure, the invention is accordingly defined by the following claims.

What is claimed is:

1. An extendable and retractable telescoping eyewear retaining strap assembly attachable to the temple of an eyewear frame comprising in combination:
   A. a flexible inner retaining strap member;
   B. a flexible outer tubular retaining strap member having a temple end and an opposite inner retaining strap receiving end, said inner retaining strap member disposed within said outer strap member through said receiving end, said inner strap member further having a temple end and an opposite eyewear connecting end;
   C. attaching means for attaching said assembly to said temple;
   D. strap securing means to secure said inner strap member within said outer strap member when said inner strap is retracted within said outer strap;
   E. strap separation prevention means to prevent the separation of said outer and inner straps when said inner strap is extended from said outer strap;
   F. fastening means attached to said inner strap at said eyewear connecting end attachable to said eyewear; and
   wherein said eyewear has a hollow temple and a temple retainer strap disposed within said temple and said attaching means comprises a coupling attached to the temple end of said outer strap, said coupling attachable to said temple retainer strap.

2. The assembly of claim 1 wherein said inner strap is elastic.

3. The assembly of claim 1 wherein said inner strap is inelastic.

4. The assembly of claim 1 wherein said strap securing means comprises a first threaded coupling disposed at the inner strap receiving end of said outer strap member and a second threaded coupling arranged to mate with said first coupling attached to said inner strap member at said eyewear connecting end.

5. The assembly of claim 1 wherein said strap separation prevention means comprises a plate attached to said inner strap member at said temple end.

6. An extendable and retractable telescoping eyewear retaining strap assembly attachable to the temple of an eyewear frame comprising in combination:
   A. a flexible inner retaining strap member;
   B. a flexible outer tubular retaining strap member having a temple end and an opposite inner retaining strap receiving end, said inner retaining strap member disposed within said outer strap member through said receiving end, said inner strap member further having a temple end and an opposite eyewear connecting end;
   C. attaching means for attaching said assembly to said temple;
   D. strap securing means to secure said inner strap member within said outer strap member when said inner strap is retracted within said outer strap, said strap securing means comprising a first threaded coupling disposed at the inner strap receiving end of said outer strap member and a second threaded coupling arranged to mate with said first coupling attached to said inner strap member at said eyewear connecting end;
   E. strap separation prevention means to prevent the separation of said outer and inner straps when said inner strap is extended from said outer strap; and
   F. fastening means attached to said inner strap at said eyewear connecting end attachable to said eyewear.

7. The assembly of claim 6 wherein said attaching means comprises a loop of cord attached to said temple end of said outer strap .

8. The assembly of claim 6 wherein said inner strap is elastic.

9. The assembly of claim 6 wherein said inner strap is inelastic.

10. The assembly of claim 6 wherein said strap separation prevention means comprises a plate attached to said inner strap member at said temple end.

* * * * *